(12) United States Patent
Prebble

(10) Patent No.: US 8,228,555 B2
(45) Date of Patent: Jul. 24, 2012

(54) SYSTEMS AND METHODS FOR PARALLEL DISPLAY LIST RASTERIZATION

(75) Inventor: Tim Prebble, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1150 days.

(21) Appl. No.: 12/059,627

(22) Filed: Mar. 31, 2008

(65) Prior Publication Data
US 2009/0244593 A1 Oct. 1, 2009

(51) Int. Cl.
G06F 15/00 (2006.01)
G06K 1/00 (2006.01)
H04N 1/60 (2006.01)
G06F 3/12 (2006.01)

(52) U.S. Cl. .................................... 358/1.9; 358/1.13
(58) Field of Classification Search .................. None
See application file for complete search history.

(56) References Cited

U.S. PATENT DOCUMENTS

| | | |
|---|---|---|
| 5,010,515 A | 4/1991 | Torborg et al. |
| 5,319,778 A | 6/1994 | Catino |
| 5,479,587 A | 12/1995 | Campbell et al. |
| 5,491,808 A | 2/1996 | Geist, Jr. |
| 5,502,462 A | 3/1996 | Mical et al. |
| 5,577,243 A | 11/1996 | Sherwood et al. |
| 5,778,414 A | 7/1998 | Winter et al. |
| 5,793,937 A | 8/1998 | Chura et al. |
| 5,864,342 A | 1/1999 | Kaijiya et al. |
| 5,913,018 A | 6/1999 | Sela |
| 5,959,867 A | 9/1999 | Speciner et al. |
| 5,978,893 A | 11/1999 | Bakshi et al. |
| 5,999,709 A | 12/1999 | Fiala et al. |
| 6,031,995 A | 2/2000 | George |
| 6,040,917 A | 3/2000 | Campbell et al. |
| 6,057,847 A | 5/2000 | Jenkins |
| 6,111,582 A | 8/2000 | Jenkins |
| 6,192,157 B1 | 2/2001 | Prebble |
| 6,249,793 B1 | 6/2001 | Printezis et al. |
| 6,326,964 B1 | 12/2001 | Snyder et al. |
| 6,366,289 B1 | 4/2002 | Johns |
| 6,490,670 B1 | 12/2002 | Collins et al. |
| 6,643,759 B2 | 11/2003 | Andersson et al. |
| 6,701,420 B1 | 3/2004 | Hamilton et al. |

(Continued)

OTHER PUBLICATIONS

Office Action dated Aug. 18, 2009, in U.S. Appl. No. 11/394,783, filed Mar. 31, 2006.

(Continued)

*Primary Examiner* — Douglas Tran
(74) *Attorney, Agent, or Firm* — Finnegan, Henderson, Farabow, Garrett & Dunner, L.L.P.

(57) ABSTRACT

Methods for performing rasterization on a display list are presented, wherein the display list can include bands associated with a virtual page object belonging to a first class of virtual page objects in the display list. In some embodiments, the method comprises: parsing the virtual page object to identify at least one geometric band; identifying at least one available rasterization process to rasterize the at least one geometric band; creating a second virtual page object including the geometric band, wherein the second virtual page object belongs to a second class of virtual page objects derived from the first class of virtual page objects; sending the second virtual page object including the geometric band to an available rasterization process; and rasterizing the one geometric band using the available rasterization process, wherein the rasterization process operates on the geometric band in the second virtual page object.

20 Claims, 8 Drawing Sheets

U.S. PATENT DOCUMENTS

| | | | |
|---|---|---|---|
| 6,778,292 B1 | 8/2004 | Someno | |
| 6,809,730 B2 | 10/2004 | Howson | |
| 6,860,203 B2 | 3/2005 | Danilo et al. | |
| 7,113,302 B2 | 9/2006 | Reddy et al. | |
| 7,196,710 B1 | 3/2007 | Fouladi et al. | |
| 7,697,168 B2 * | 4/2010 | Ozawa et al. | 358/3.1 |
| 7,715,031 B2 | 5/2010 | Westervelt et al. | |
| 8,045,215 B2 * | 10/2011 | Jacobsen et al. | 358/1.2 |
| 2001/0015820 A1 | 8/2001 | Conrad et al. | |
| 2001/0055129 A1 | 12/2001 | Shimizu | |
| 2002/0063894 A1 | 5/2002 | Campbell et al. | |
| 2002/0078298 A1 | 6/2002 | Jeddeloh | |
| 2002/0093669 A1 | 7/2002 | Campbell et al. | |
| 2002/0097433 A1 | 7/2002 | Chang et al. | |
| 2002/0120826 A1 | 8/2002 | Venkatraman et al. | |
| 2004/0044873 A1 | 3/2004 | Wong et al. | |
| 2004/0120007 A1 | 6/2004 | Jacobsen et al. | |
| 2004/0193775 A1 | 9/2004 | Van Doren et al. | |
| 2004/0207861 A1 | 10/2004 | Hattori | |
| 2004/0233207 A1 | 11/2004 | Morphet | |
| 2005/0044549 A1 | 2/2005 | Morikawa et al. | |
| 2005/0067498 A1 | 3/2005 | Smith | |
| 2006/0069898 A1 | 3/2006 | Patel et al. | |
| 2007/0146785 A1 | 6/2007 | Akiyama et al. | |
| 2007/0229900 A1 | 10/2007 | Guarnieri et al. | |
| 2007/0236733 A1 | 10/2007 | Guarnieri et al. | |
| 2008/0162863 A1 | 7/2008 | McClure et al. | |
| 2009/0172336 A1 | 7/2009 | Schmidt | |
| 2009/0249017 A1 | 10/2009 | Prebble | |
| 2010/0053179 A1 | 3/2010 | Bellert | |
| 2010/0060934 A1 | 3/2010 | Bellert | |
| 2010/0079809 A1 | 4/2010 | Bellert | |

OTHER PUBLICATIONS

Office Action dated Apr. 13, 2010, in U.S. Appl. No. 11/394,783, filed Mar. 31, 2006.
Office Action dated Nov. 26, 2010, in U.S. Appl. No. 11/394,783, filed Mar. 31, 2006.
Office Action dated May 23, 2011, in U.S. Appl. No. 11/394,783, filed Mar. 31, 2006.
Office Action dated Mar. 21, 2011, in U.S. Appl. No. 11/515,337, filed Aug. 31, 2006.
Office Action dated Sep. 12, 2011, in U.S. Appl. No. 11/515,337, filed Aug. 31, 2006.
Office Action dated Jan. 12, 2012, in U.S. Appl. No. 11/515,337, filed Aug. 31, 2006.
Office Action dated Oct. 7, 2010, in U.S. Appl. No. 12/059,692, filed Mar. 31, 2008.
Office Action dated Apr. 6, 2011, in U.S. Appl. No. 12/059,692, filed Mar. 31, 2008.
Office Action dated Apr. 27, 2011, in U.S. Appl. No. 12/201,735, filed Aug. 29, 2008.
Office Action dated Sep. 30, 2011, in U.S. Appl. No. 12/201,735, filed Aug. 29, 2008.
Office Action dated Dec. 15, 2011, in U.S. Appl. No. 12/209,046, filed Sep. 11, 2008.
Office Action dated Jul. 1, 2011, in U.S. Appl. No. 12/242,668, filed Sep. 30, 2008.

* cited by examiner

SYSTEMS AND METHODS FOR PARALLEL DISPLAY LIST RASTERIZATION

BACKGROUND

1. Field of the Invention

The present invention relates to the field of printing and in particular, to systems and methods to parallelize rasterization of display lists.

2. Description of Related Art

Document processing software allows users to view, edit, process, and store documents conveniently. Pages in a document may be displayed on screen exactly as they would appear in print. However, before the document can be printed, pages in the document are often described in a page description language ("PDL"). As used in this document PDL's may include PostScript, Adobe PDF, HP PCL, Microsoft XPS, and variants thereof as well as any other languages used to describe pages in a document. A PDL description of a document provides a high-level description of each page in a document. This PDL description is often translated to a series of lower-level printer-specific commands when the document is being printed. The process of translation from a PDL description of a document to a lower-level description that may be used to place marks on a print medium is termed rasterization.

The translation process from PDL to lower-level printer-specific commands may be complex and depend on the features and capabilities offered by a particular printer. Flexible and portable general-purpose schemes to translate PDL descriptions of documents to printer-specific commands may allow for the optimization of printer performance based on available memory, desired print speed, and other cost and performance criteria. By parallelizing one or more print processing functions, increased speed and performance may be extracted from printing systems with only a minimal increase in cost. Because rasterization is a significant portion of the tasks involved in print processing, the parallelization of one of more steps performed during the rasterization process will directly help in increasing overall printer speed and performance. Thus, there is a need for a scheme for the parallel rasterization of display lists that builds on prior performance optimizations.

SUMMARY

Consistent with disclosed embodiments, systems and methods for performing rasterization on a display list are presented, wherein the display list can include bands associated with a virtual page object belonging to a first class of virtual page objects in the display list. In some embodiments, the method comprises: parsing the virtual page object to identify at least one geometric band; identifying at least one available rasterization process to rasterize the at least one geometric band; creating a second virtual page object including the geometric band, wherein the second virtual page object belongs to a second class of virtual page objects derived from the first class of virtual page objects; sending the second virtual page object including the geometric band to an available rasterization process; and rasterizing the one geometric band using the available rasterization process, wherein the rasterization process operates on the geometric band in the second virtual page object.

Embodiments of the present invention also relate to methods created, stored, accessed, or modified by processors using computer-readable media or computer-readable memory.

These and other embodiments are further explained below with respect to the following figures.

DETAILED DESCRIPTION

In accordance with embodiments reflecting various features of the present invention, systems and methods for the automatic storing, manipulating, and processing of a second or intermediate form of printable data generated from a first printable data are presented. In some embodiments, the first printable data may take the form of a PDL description of a document and the intermediate printable data may take the form of a display list of objects generated from the PDL description.

Figure 1:
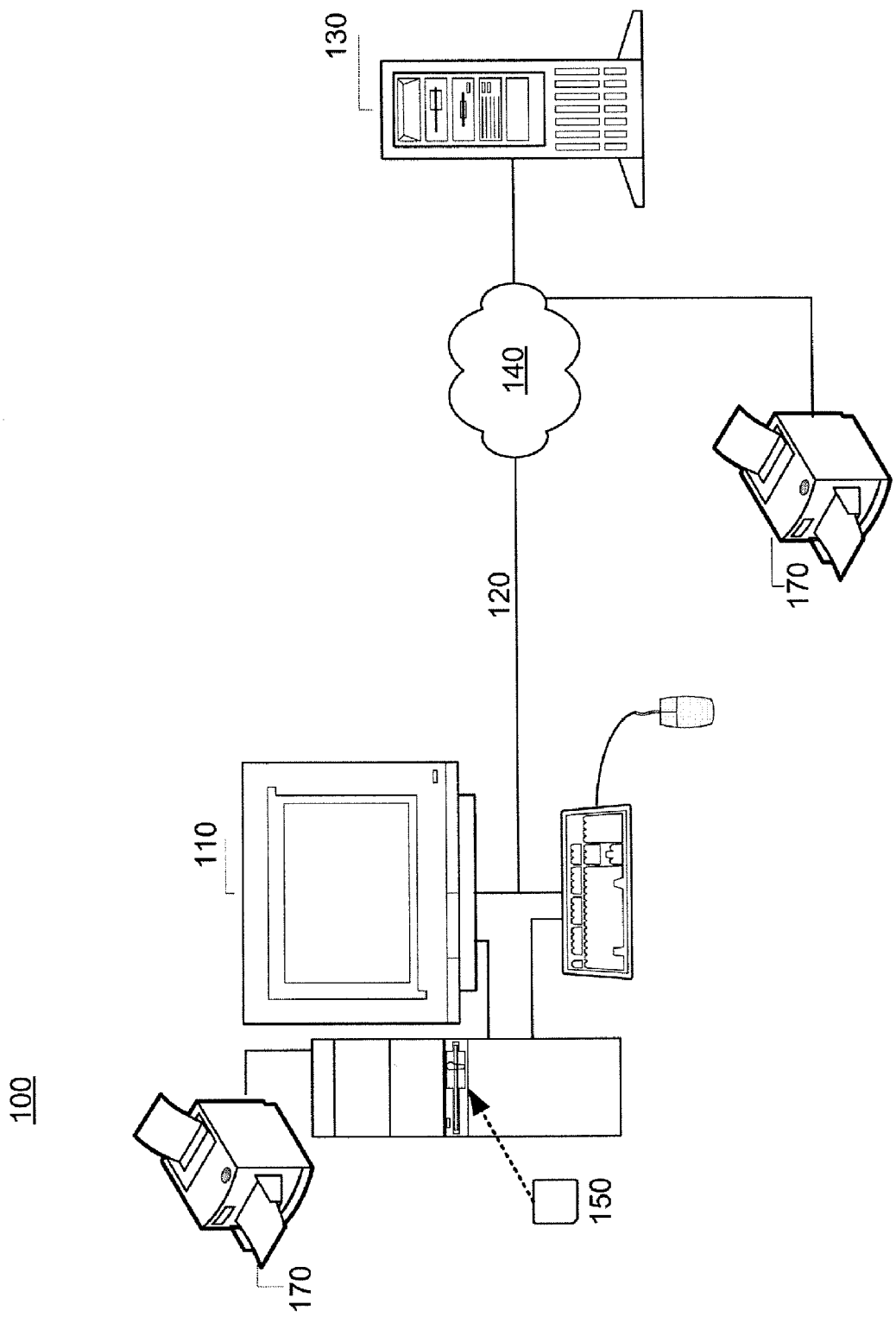
FIG. 1 shows a block diagram illustrating components in a system for printing documents according to some embodiments.

FIG. 1 shows a block diagram illustrating components in a system for printing documents according to some embodiments of the present invention. A computer software application consistent with the present invention may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, but not limited to, laser printers, ink-jet printers, LED printers, plotters, facsimile machines, and digital copiers. In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, documents may contain one or more of text, graphics, and images. In some embodiments, printer 170 may receive PDL descriptions of documents for printing. Note, too, that document print processing can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/ or any other removable media drives consistent with embodiments of the present invention. In some embodiments, portions of the software application may reside on removable media and be read and executed by computing device 110 using removable media drive 150.

Connection 120 couples computing device 110, server 130, and printer 170 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection. In some embodiments, connection 120 may be a Digital Subscriber Line (DSL), an Asymmetric Digital Subscriber Line (ADSL), or a cable connection. The communication links could be wireless links or wired links or any combination consistent with embodiments of the present invention that allows communication between the various devices.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. In some embodiments, printer 170 may also be connected directly to computing device 110 and/or server 130. System 100 may also include other peripheral devices (not shown), according to some embodiments of the present invention. A computer software application consistent with the present invention may be deployed on any of the exemplary computers, as shown in FIG. 1. For example, computing device 110 could execute software that may be downloaded directly from server 130. Portions of the application may also be executed by printer 170 in accordance with some embodiments of the present invention.

Figure 2:
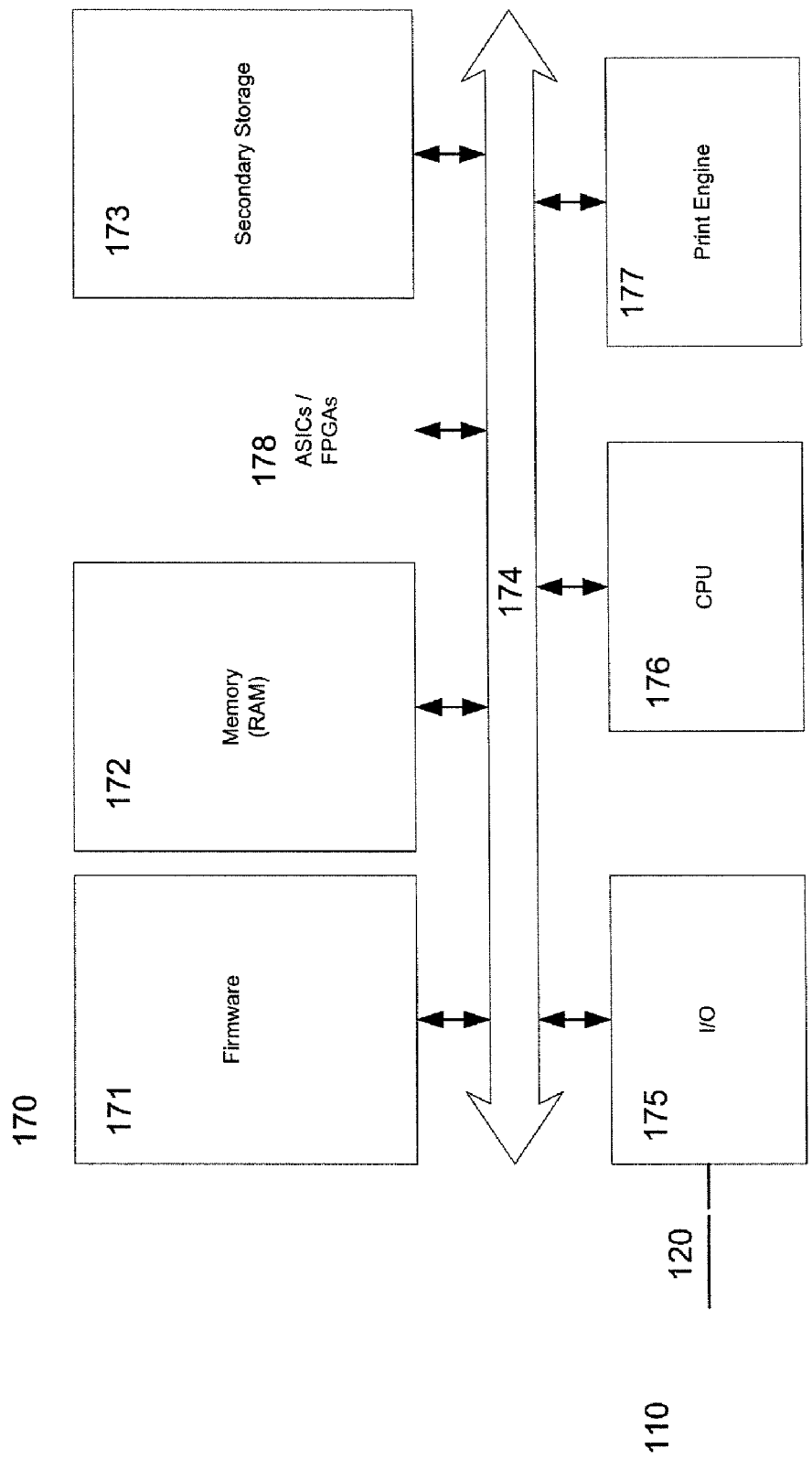
FIG. 2 shows a high level block diagram of an exemplary printer.

FIG. 2 shows a high-level block diagram of exemplary printer 170. In some embodiments, printer 170 may contain bus 174 that couples CPU 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to print documents according to some embodiments of the present invention. In some embodiments, printer 170 may also be able to access secondary storage or other memory in computing device 110 using I/O ports 175 and connection 120. In some embodiments, printer 170 may also be capable of executing software including a printer operating system and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines, and other code. In some embodiments, code and data in firmware 171 may be copied to memory 172 prior to being acted upon by CPU 176. Routines in firmware 171 may include code to translate page descriptions received from computing device 110 to display lists and image bands. In some embodiments, firmware 171 may include rasterization routines to convert display commands in a display list to an appropriate rasterized bit map and store the bit map in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and rasterization algorithms. In some embodiments, computing device 110 can transform document data into a first printable data. Then, the first printable data can be sent to printer 170 for transformation into intermediate printable data. Printer 170 may transform intermediate printable data into a final form of printable data and print according to this final form. In some embodiments, the first printable data may correspond to a PDL description of a document. In some embodiments, the translation process from a PDL description of a document to the final printable data comprising of a series of lower-level printer-specific commands may include the generation intermediate printable data comprising of display lists of objects.

In some embodiments, display lists may hold one or more of text, graphics, and image data objects. In some embodiments, objects in display lists may correspond to similar objects in a user document. In some embodiments, display lists may aid in the generation of intermediate printable data. In some embodiments, display lists may be stored in memory 172 or secondary storage 173. Exemplary secondary storage 173 may be an internal or external hard disk, memory stick, or any other memory storage device capable of being used system 200. In some embodiments, the display list may reside one or more of printer 170, computing device 110, and server 130. Memory to store display lists may be a dedicated memory or form part of general purpose memory, or some combination thereof according to some embodiments of the present invention. In some embodiments, memory may be dynamically allocated to hold display lists as needed. In some embodiments, memory allocated to store display lists may be dynamically released after processing.

Figure 3:
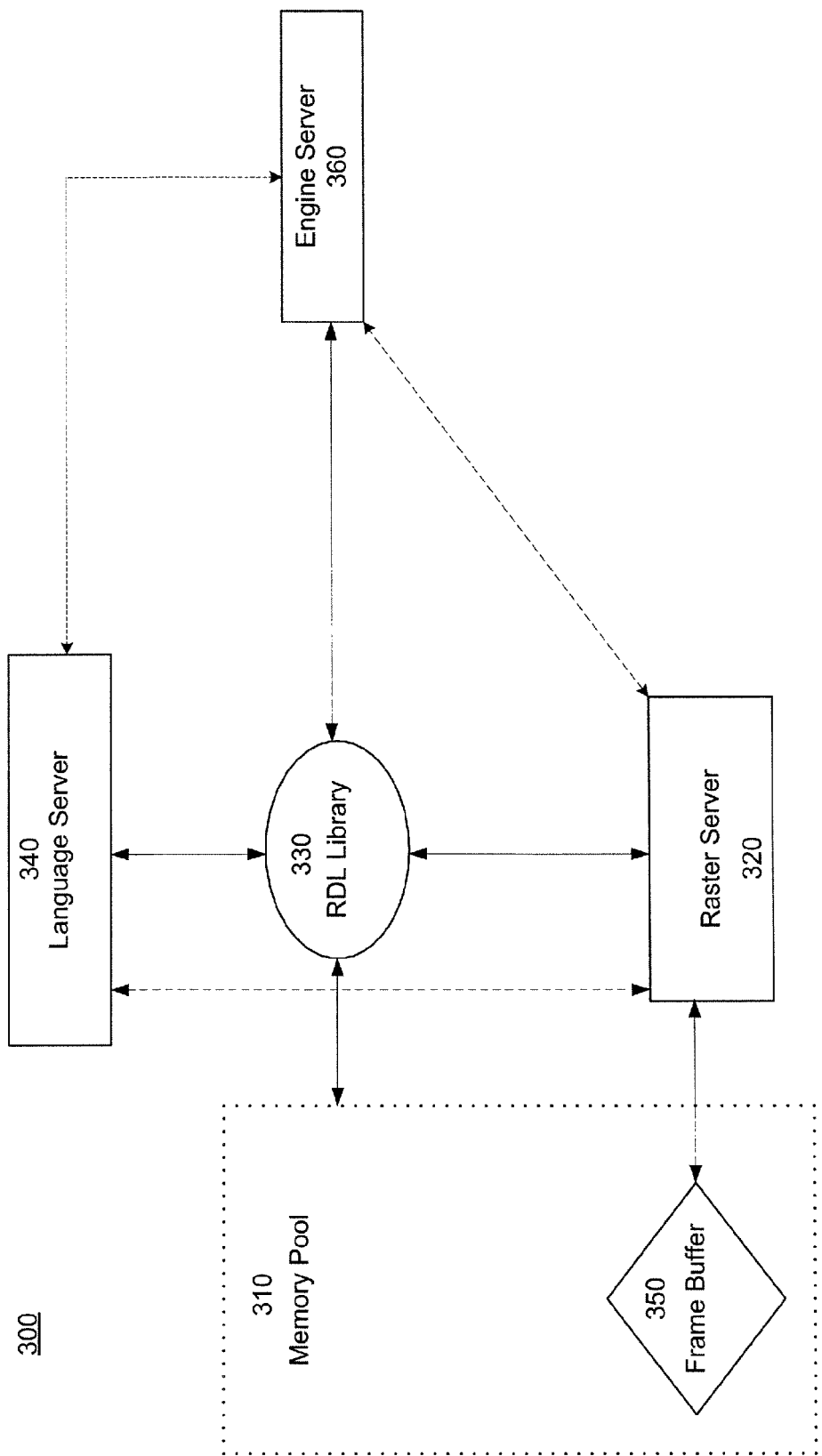
FIG. 3 shows an exemplary high-level architecture of a system for flexible display lists according to some embodiments.

FIG. 3 shows an exemplary high-level architecture of a system for creating and processing display lists generated from PDLs. As shown in FIG. 3, language server 340, engine server 360, and raster server 320 may communicate with each other. In addition, language server 340, engine server 360, and raster server 320 may invoke routines and communicate with RDL library 330. In some embodiments, the display list may include commands defining data objects and their contexts within a document or a page within the document to be printed. These display commands may include data comprising characters or text, line drawings or vectors, and images or raster data.

In some embodiments, the display list may be dynamically reconfigurable and is termed a Reconfigurable Display List ("RDL"). In one embodiment, an RDL may be implemented using a data structure that allows certain display list objects to be stored in a manner that allows their manipulation dynamically. For example, image objects may be compressed in place to increase the amount of available memory, and decompressed when referenced and/or used. In some embodiments, an RDL may also permit RDL objects to be stored in memory and/or secondary storage by holding pointers, offsets, or addresses to the actual locations of RDL objects, which can then be retrieved when referenced and/or used. In general, the RDL allows display list objects to be flexibly stored and manipulated based on system constraints and parameters.

In one embodiment, the translation of a PDL description of a document into a display list and/or RDL representation may be performed by language server 340 using routines in RDL library 330. For example, language server 340 may take PDL language primitives and transform these into data and graphical objects and add these to the reconfigurable display list using the capability provided by functions in RDL library 330. Access to functions and routines in RDL library 330 may be provided through an Application Programming Interface ("API"). In some embodiments, the display list may be stored and manipulated in a dynamically allocated memory pool such as exemplary memory pool 320, which may be part of memory 172.

In some embodiments, creation of the RDL may be an intermediate step in the processing of data prior to actual printing. The RDL may be parsed before conversion into a subsequent form. In some embodiments the subsequent form may be a final representation, and the conversion process may be referred to as rasterizing the data. In some embodiments rasterization may be performed by raster server 320. Upon rasterization, the rasterized data may be stored in frame buffer 350, which may be part of memory 172. In some embodiments, the rasterized data may take the form of a bitmap that specifies the marks to be made on a printed page.

In one embodiment, routines in RDL library 330 may manage some subset of available memory in memory 172 as memory pool 310 and allocate memory from memory pool 310 to requesting processes. When memory is no longer needed by the requesting processes, the memory may be de-allocated and returned to memory pool 310, where it can be made available to other processes. In some embodiments, routines in RDL library 330 may also include various other memory management routines, including routines to free memory, routines to recover memory, and swapping routines that can swap memory to secondary storage 173. In some embodiments, frame buffer 350 may also be a part of memory pool 310. In one embodiment, frame buffer 350 may be allocated an initial contiguous block of memory and subsequent memory blocks may be allocated to frame buffer 350 when requested. Memory blocks may also be allocated for other non frame-buffer purposes from memory pool 310. In some embodiments, distinct memory blocks assigned to the frame buffer or to other processes may occupy non-contiguous memory locations in memory 172.

Print engine 177, may process the rasterized data in frame buffer 350, and form a printable image of the page on a print medium, such as paper. In some embodiments, raster server 320 and engine server 360 may also use routines in RDL library 330 to perform their functions. In some embodiments, engine server 360 may provide control information, instructions, and data to print engine 177. In some embodiments, engine server 360 may free memory used by display list objects after processing for return to memory pool 320. In some embodiments, portions of RDL memory pool and/or frame buffer 350 may reside in memory 172 or secondary storage 173. In some embodiments, routines for language server 340, raster server 320, and engine server 360 may be provided in firmware 171 or may be implemented using ASICs/FPGAs 178.

Figure 4:
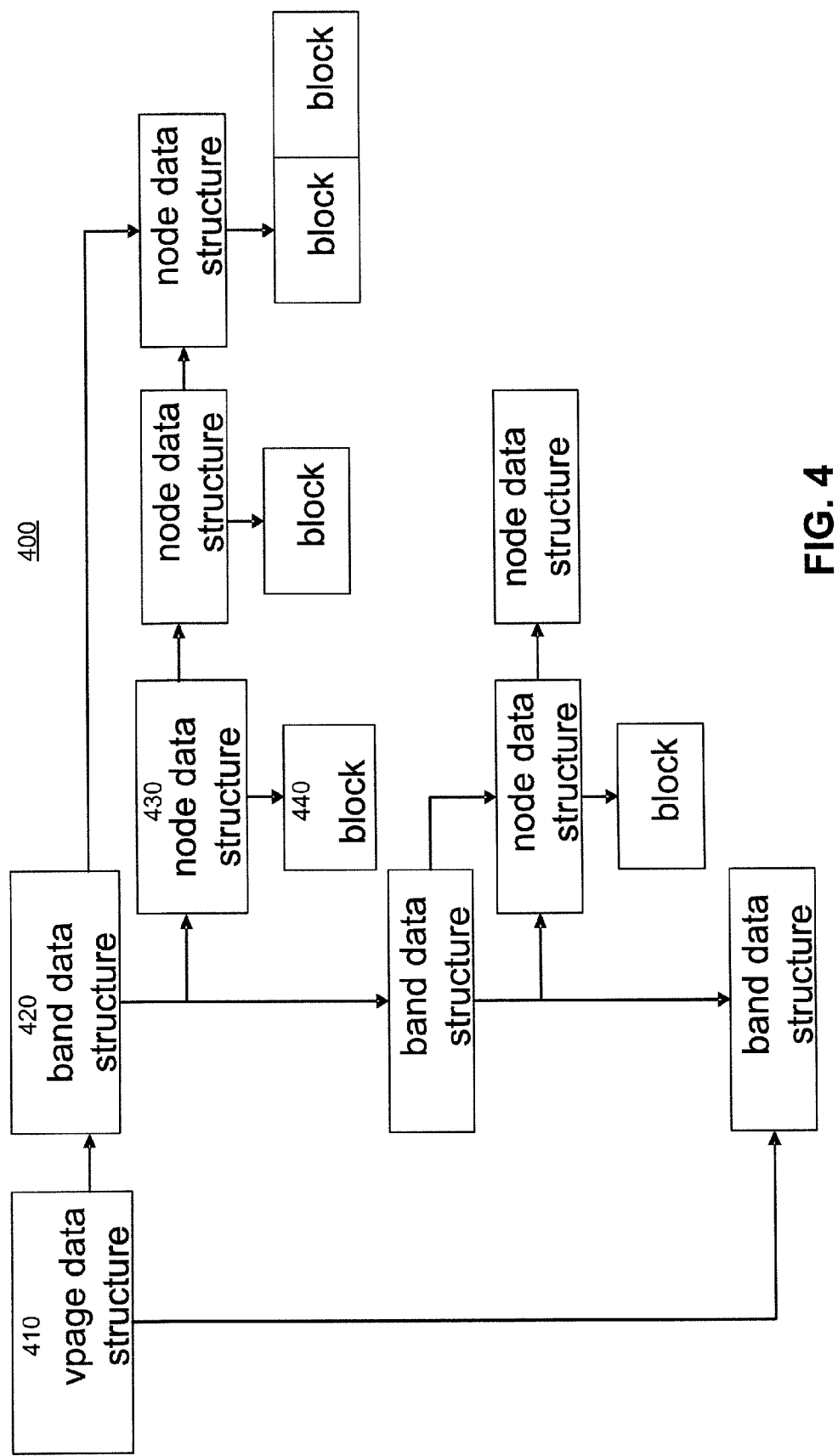
FIG. 4 shows an exemplary data structure for flexible display lists according to some embodiments.

FIG. 4 shows an exemplary data structure 400 for flexible display lists. In some embodiments, flexible display lists may take the form of RDLs. In some embodiments, flexible display lists, such as exemplary RDLs, may be stored in a data structure, such as exemplary data structure 400 that facilitates the dynamic manipulation and processing of data objects. For example, objects in the RDL may include pointers to other objects in the RDL. Accordingly, an application may be able to traverse the list from one object to the next to identify, update, manipulate, and process objects. In addition, the application may be able to track processed objects and identify the "current" object being processed. In some embodiments, a physical page may comprise one or more virtual or logical pages. In some embodiments, a virtual or logical page may be represented by exemplary vpage data structure 410. Instantiated vpage data structures 410 are referred to as vpages. In some embodiments, exemplary vpage data 410 allows a logical model of a virtual page to be stored and manipulated in memory, such as exemplary memory 172. In some embodiments, vpage data structure 410 may include information specific to a virtual or logical page, including offsets to geometric bands, referenced bands, and compression bands.

In some embodiments, a virtual page may further comprise one or more bands, which are also called geometric bands or regular bands. In some embodiments, the bands may be horizontal bands or sections each holding objects present within that band of the logical page. Accordingly, vpage data structure 410 may include offsets to or reference a linked list comprising of instances of exemplary individual band data structures (also called geometric band data structures) 420. Instantiated band data structures 420 are referred to as bands (or geometric bands). In some embodiments, vpage data structure may further comprise a linked list of instances of exemplary individual band data structures 420. In some embodiments, each vpage data structure 410 may include information about any bands that it references. A band or geometric band relates to a geometrically defined region within the geometrical bounds of a virtual page. Typically this geometric region is rectangular in nature and may be as large as the vpage boundaries, or a sub region of the vpage. In some embodiments, the printable region of a vpage includes all geometric bands contained within that vpage.

In some embodiments, when data or graphical objects generated by language server 340 span geometric band boundaries the objects may be stored in a separate referenced band and an offset to the location of the object in the referenced band is stored at an appropriate location in that specific geometric band. In some embodiments, objects that are repeatedly used in a virtual page, or a document, may also be stored in a referenced band. The use of referenced bands to store repeatedly used objects optimizes memory utilization and allows a repeatedly used object to be placed in a referenced band once, but used multiple times across bands. The referenced bands can include objects, which are referred to by geometrical bands. So, for example, a single object in a single referenced band may be referred to multiple times by multiple geometrical bands.

The term band data is used to refer to object data within block 440 that is linked to a node data structure 430 that is further linked to band data structure 420. In some embodiments, individual band data structure 420 may contain data objects pertaining to that entire band. In some embodiments each band data structure may include offsets to or reference a linked list of instances of individual node data structures 430. Instantiated node data structures 430 are referred to as nodes. In some embodiments, each band data structure 420 may include information about any nodes that it references.

In some embodiments, individual node data structure 430 may include offsets to or reference any associated (zero or more) blocks of memory ("blocks") 440. In some embodiments, block 440 may be used to store intermediate graphical objects and other data generated from a PDL description. In some embodiments, language server 340 may generate intermediate graphical objects and other data objects from a PDL description for use by raster server 320. In some embodiments, each node data structure may include information about any blocks that it references. In some embodiments, blocks 440 may be a uniform, fixed size. In this specification, vpage data structure 410, band data structure 420, and node data structure 430 are also referred to as control data structures. In some embodiments, data stored in data structure 400 may also be accessed and edited.

In some embodiments, when a job is received by printer 170 language server 340 may invoke routines from RDL library 330 leading to the instantiations of vpage data structure 410 and an appropriate number of band data structures 420. In some embodiments, the system may maintain a list of free vpages, bands, and nodes in a vpage control data field, a band control data field, and a node control data field, respectively. Further, a linked list of such control objects may be created, maintained, and updated by one or more routines RDL library 330 and the routines may be invoked at various points during the processing of a RDL. In some embodiments, an instantiation of another vpage data structure 410 may occur for new virtual pages. In some embodiments, an instantiation of another band data structure may occur for new bands in a virtual page.

In some embodiments, objects generated by language server 340 may be used to build a vpage. A vpage may be rasterized by raster server 320. In some embodiments, a vpage may be rasterized band-by-band until all bands have been processed. In some embodiments, a band may be rasterized object-by-object until all objects have been provided to the rasterizer for that band. In some embodiments, the rasterization process may be parallelized. For example, multiple processes may operate in parallel to rasterize multiple bands. In some embodiments, the parallel processes performing the rasterization may be slave processes operating under the control of at least one master process, which can provide control and synchronization information. For example, the master process can control the creation and deletion of flexible display. In some embodiments, the order in which bands may be rasterized may not be sequential. In a further embodiment, multiple finished vpages may exist in the system at any given time. These may include vpages whose rasterization process has not completed. In some embodiments, vpages need not be rasterized in the order of their construction. After rasterization is complete, engine server 360 may invoke routines in RDL library 330 to delete the vpage from memory, and release memory used by that vpage to memory pool 310.

In one embodiment, multiple rasterization processes can rasterize different parts of the display list for a single virtual page (vpage) simultaneously. For example, in a master-slave environment, each parallel slave process can be assigned a geometrical band to rasterize. In some embodiments, the geometric bands assigned to each slave process may be distinct. In some embodiments, slave processes, termed "local slaves," may have access to the same memory areas, data structures, and data as the master. In some embodiments, slave processes, termed "remote slaves," may have access to their separate memory areas. For example, a local" slave may have access to an "original" RDL in memory 172. Accordingly, routines in RDL library 330 can permit shared access by local slave processes to RDL objects simultaneously. As another example, a remote slave may copy relevant portions of RDL for rasterization to its allocated memory locations and perform operations of the copy. For remote slaves, a copy of display list objects and data can be transmitted to the slave processes. In some embodiments, the allocation of bands to remote slaves for processing may be based in part on the quantity of data and code transmitted to the remote slave.

Figure 5:
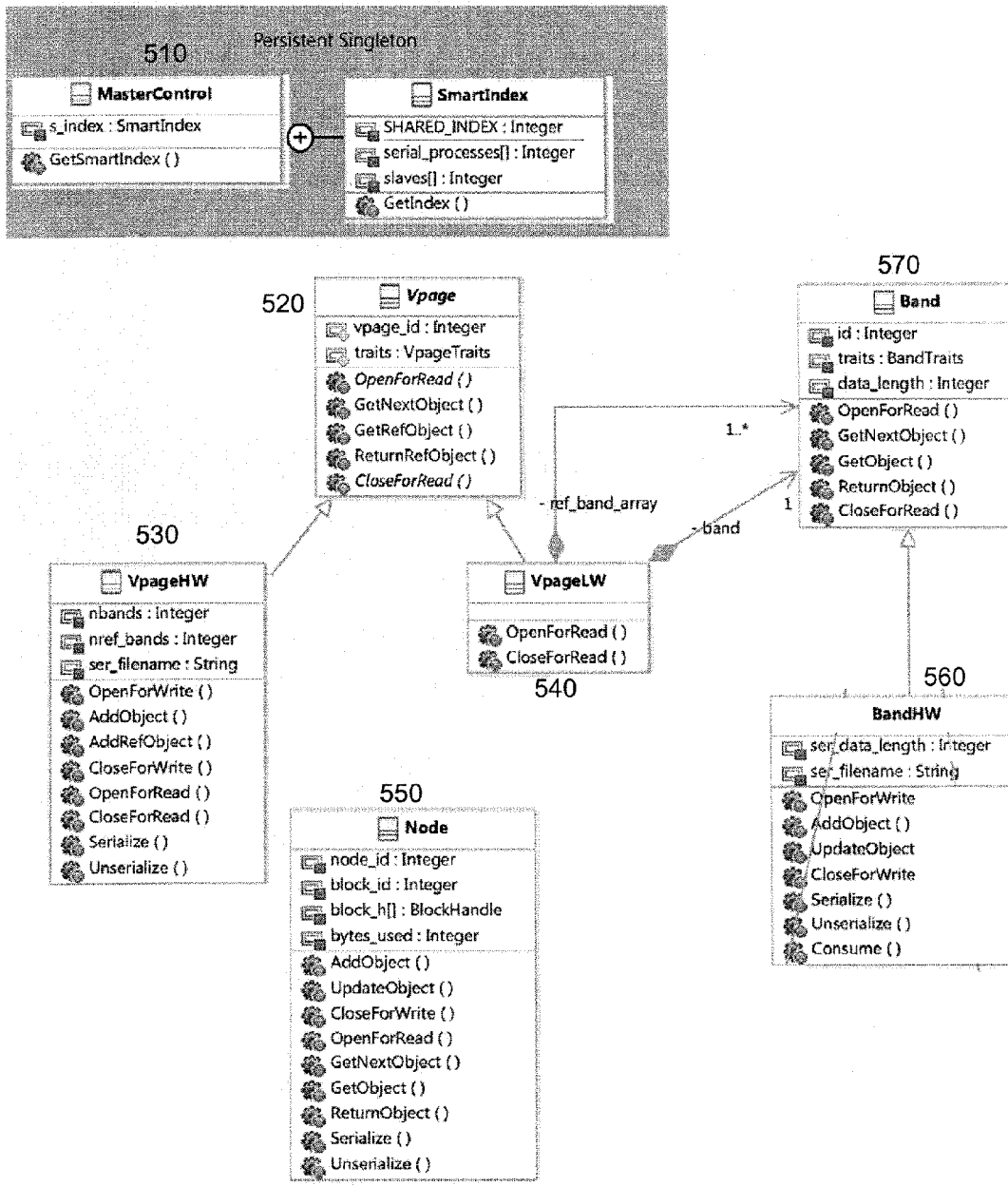
FIG. 5 is an exemplary RDL class diagram.

FIG. 5 shows a portion of an exemplary class diagram 500 in an exemplary object oriented implementation of an RDL to support parallel rasterization. The class structure includes persistent singleton Master Control 510, which can be used to provide an index appropriate for any given process into block_h array of Node 550, thereby allowing that process access to a block pointer, which is valid for the address space of that process. Declaring Master Control 510 as a persistent singleton ensures that there is a single instance of Master Control, that its identity does not change during code execution, and that there is a global point of access to Master Control. Classes and/or sub-classes 520 through 570 indicate one implementation of data structure 400 for flexible display lists such as RDL. Objects belonging to the various classes may be instantiated during execution.

As shown in FIG. 5, a first class may include Vpage 520, Node 550, Band 570, and MasterControl 510 classes. These are referred to as "control classes." Subclasses VPageHW 530 and VPageLW 540 can be derived from VPage 520. Similarly, BandHW 560 can be derived from Band 570. In one embodiment, the class structure may parallel hierarchical data structure 400 shown in FIG. 4. For example, a band object (which is an instance of Band class 570) may be associated with a list of node objects (which are instances of Node class 550). Further, each node object may refer to a block.

As shown in FIG. 5, in one embodiment, the node object can refer to a single block of memory using an array of Node::BlockHandle objects. In some embodiments, blocks referenced by nodes can hold data for the display list. In some embodiments, fixed size blocks may be used. In the embodiment shown in FIG. 5, each BlockHandle object can hold data including a pointer to a block, a field indicating the number of users of the pointer, and a reading location indicator, which points to a current location within the block that is being read. In one embodiment, one BlockHandle object may be instantiated per slave process. Slave processes may therefore be capable of accessing a node's block concurrently using their individual BlockHandle objects. In addition, one BlockHandle object may be instantiated and shared by all non-slave processes. When the GetSmartindex( ) method in MasterControl is invoked, GetSmartindex returns a shared index for non-slave processes, or a unique index for each slave process. The unique index, which is unique to a slave, may be used to manipulate a slave's individual BlockHandle object.

In some embodiments, a flexible display list may be structured to minimize the quantum of code and/or data to be transmitted to remote slaves. In one embodiment, classes 520 through 570, which constitute portions of the display list code, can consist of two variants shown as heavy-weight (HW) and light-weight (LW) variants. These variants can include, for example, heavyweight variant VPageHW 530 and lightweight variant VPageLW 540, and heavyweight variant BandHW 560 and lightweight variant Band 570. Heavyweight and lightweight variants may also exist for other classes (not shown). Although, two variants have been shown for simplicity, in general the number of class or subclass variants may vary and depend on system design parameters. For example, because a remote slave can operate on a copy of display list objects and data using its own copy of the display list code, it is beneficial to decrease the volume of copies of code, objects, and data to be utilized by a remote slave. Accordingly, in some embodiments, an additional class may be created depending on whether a slave is a local slave or a remote slave. As another example, a local slave may include synchronization methods to allow multiple slave processes to access shared display list objects and data simultaneously, whereas remote slaves, which operate on their own copies may not be provided with such methods.

As shown in FIG. 5, objects of either VPageHW 530 or VPage LW 540 class include OpenForRead and CloseForRead methods. However, VPageHW 530 also includes methods such as OpenForWrite, AddObject, AddRefObject, and Serialize that are not present in, or available to, objects of class VPageLW 540. In some embodiments, heavyweight class variants can be used for non-slave processes, while LW variants can be used for slave processes. In some embodiments, a lightweight vpage may include referenced band objects, in addition to any geometrical band object. In some embodiments, HW variants can be designed to provide greater functionality than their LW counterparts. Accordingly, LW variants can be smaller and contain code and data used by slave processes to perform rasterization without some of the additional functionality available to HW class variants. For example, HW variants may include methods to allow for the creation and deletion of display lists. In some embodiments, methods for the creation and deletion of display lists may not be made available to slave processes.

Figure 6:
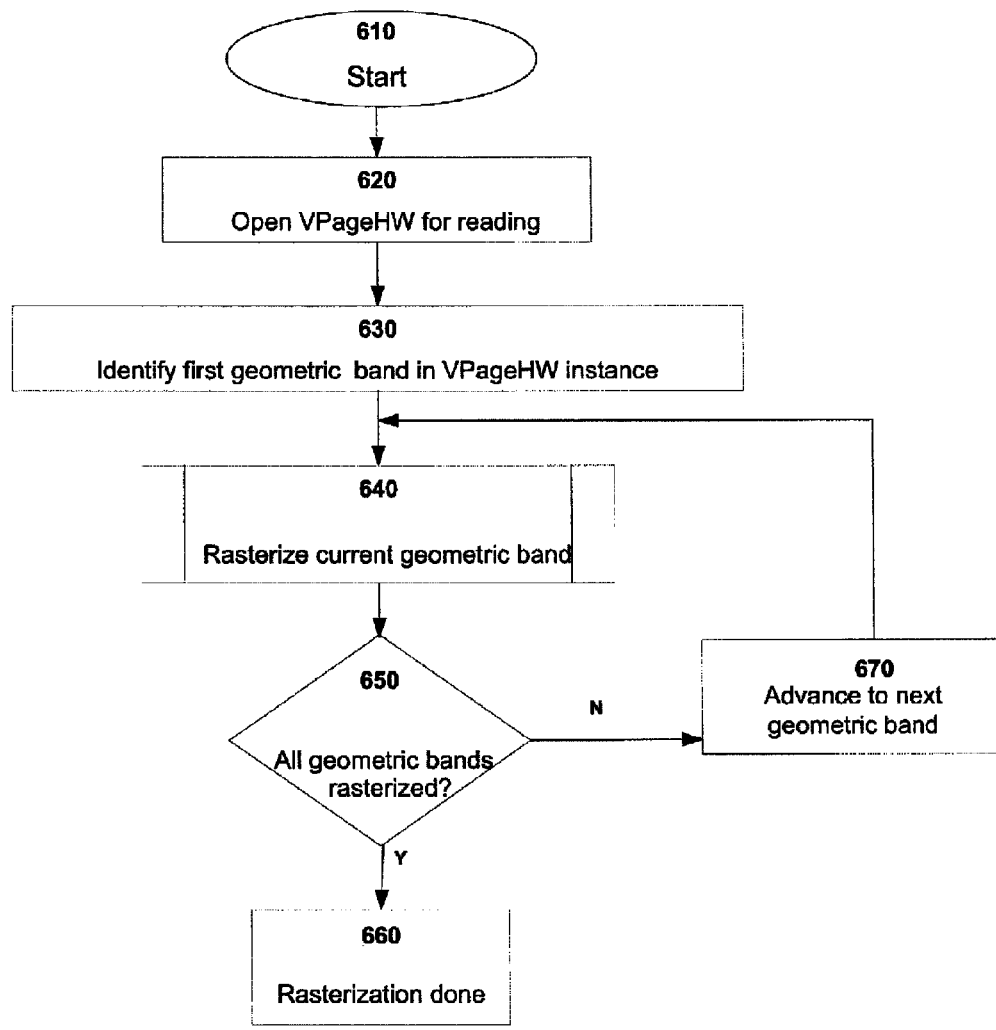
FIG. 6 shows a flowchart for an exemplary algorithm to rasterize a virtual page.

FIG. 6 shows an exemplary flowchart 600 of an algorithm for sequential rasterization of flexible display lists. The algorithm may commence in step 610. In step 620, VPageHW 530 can be opened for reading. For example, VPageHW::OpenForRead( ) can be called for a VPageHW 530 object which exists in memory. The VPageHW::OpenForRead( ) function can open geometric and referenced bands for reading. In one embodiment, opening a band 420 can include opening nodes 430 in the band and setting a current node iterator for the band to the beginning of the node list. Opening a node can include setting a current reading location indicator for node 430 the beginning of a data block for the node. Next, in step 630, the algorithm may identify the first geometric band in object VPageHW 530. The band can then be rasterized by a rasterization routine 640 for geometric bands. In step 650, the algorithm checks if all geometric bands in object VPageHW 530 have been rasterized. If there are geometric bands that have not been rasterized then the algorithm can advance to the next geometric band in object VPageHW 520 in step 670. The algorithm iterates through steps 640, 650, and 670 until all geometric bands have been rasterized before terminating in step 660.

Figure 7:
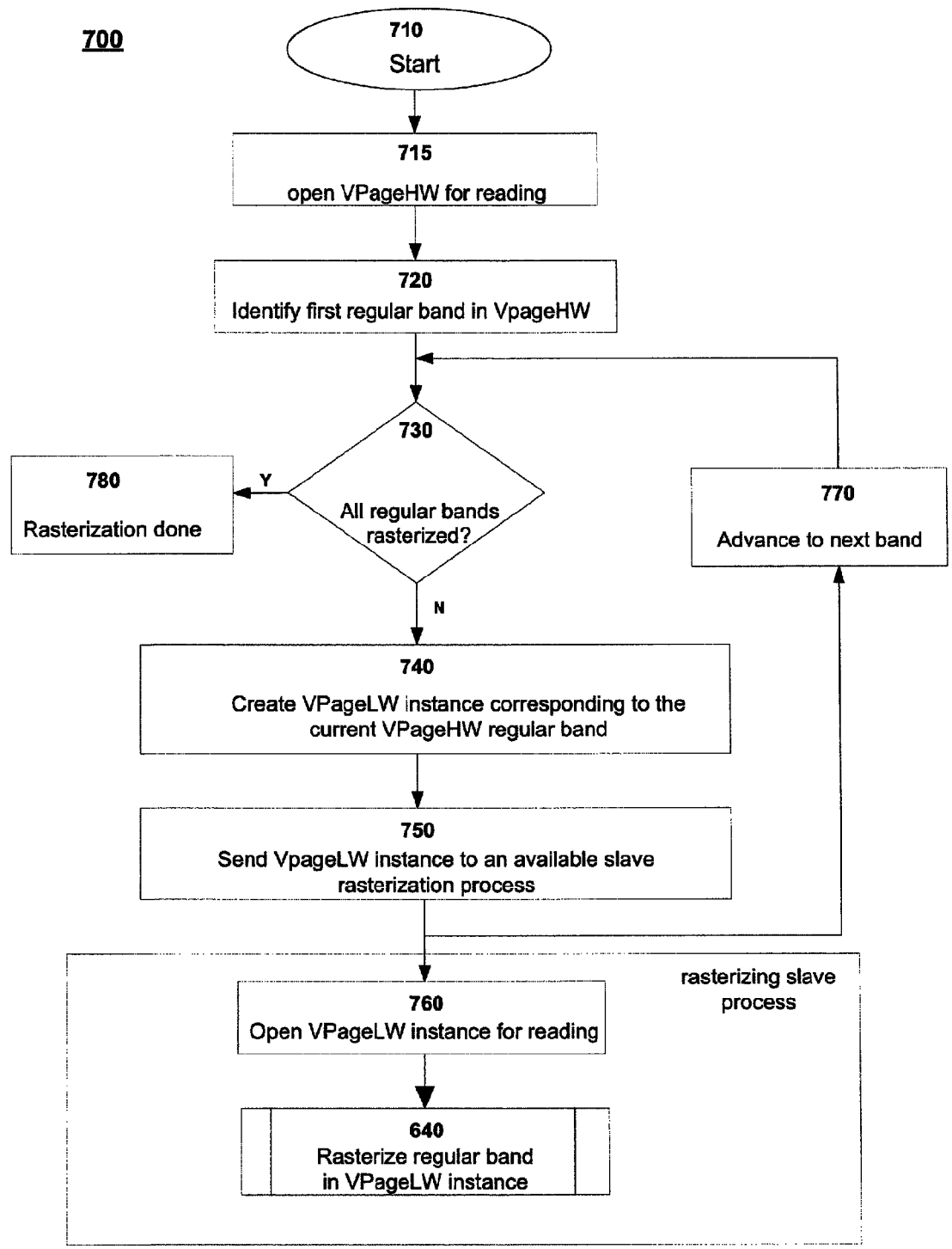
FIG. 7 shows an exemplary flowchart 700 of an algorithm for rasterizing a VPage object using multiple processes.

FIG. 7 shows an exemplary flowchart 700 of an algorithm for rasterizing a VPage object using multiple processes. The algorithm may commence in step 710. In step 720, object VPageHW 530 can be opened for reading. For example, the OpenForRead method in VPageHW 530 may be invoked. In some embodiments, VPageHW::OpenForRead( ) may be called by a master process to open geometric and referenced bands for reading. In step 730, the algorithm checks if all geometric bands in object VPageHW 530 have been rasterized. If there are geometric bands that have not been rasterized then, in step 740, the algorithm instantiates an VPageLW 540 object corresponding to the current geometric band in object VPageHW 530. In some embodiments, VPageLW object 540 can contain a single geometric band object corresponding to a specified regular BandHW object in VPageHW 530 and may also contain objects corresponding to referenced bands in VPageHW 530.

In step 750, object VPageLW 540 can be sent to a slave process. In some embodiments, a reference or a pointer to object VPageLW 540 can be sent to a slave process. For example, a rasterization master process can send VPageLW object 540 to a slave process. In step 760, object VPageLW 540 can be opened for reading, followed by the invocation of rasterization routine 640. In step 770, the algorithm can advance to the next geometric band in object VPageHW 520 and iterate through steps 730 to 750, if there are bands that have not been rasterized. In some embodiments, a master rasterization process may iterate through steps 730 to 760, while step 760 and the invocation of the rasterization routine 640 on bands in VPageLW 540 can be performed by a slave process. If all bands have been rasterized, the algorithm can terminate in step 780.

Figure 8:
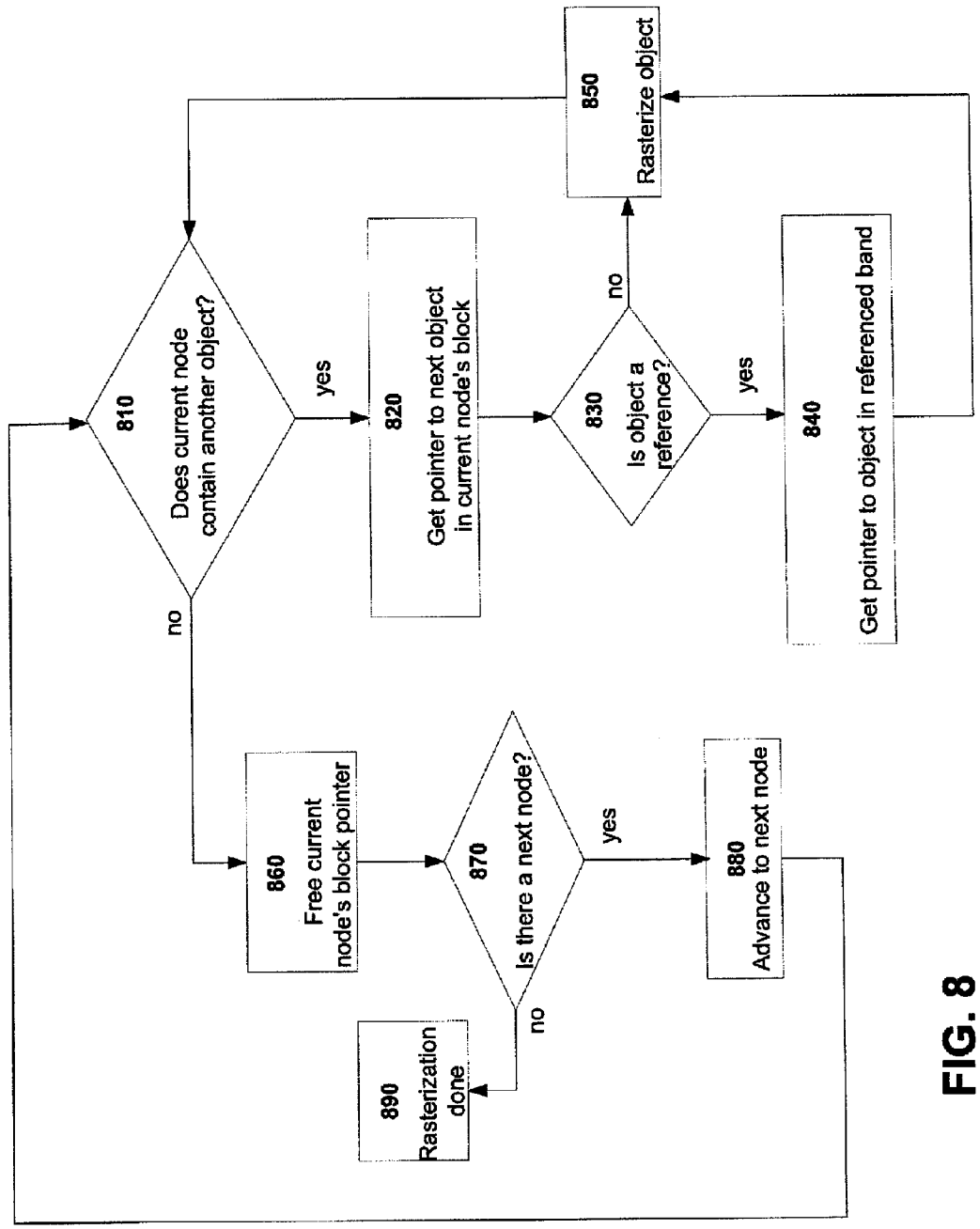
FIG. 8 shows a flowchart illustrating steps performed by exemplary rasterization routine 640 for a geometric band.

FIG. 8 shows a flowchart illustrating steps performed by exemplary rasterization routine 640 for a geometric band. When rasterization routine 640 is invoked, in step 810, the current node is checked to determine whether it contains any objects that have not been rasterized. If there are objects that have not been rasterized then, in step 820, exemplary rasterization routine 640 obtain a pointer to the next object in a block for the current node. In step 830, if the object is determined to be in a referenced band, then a pointer to the object in the referenced band can be obtained in step 840. If the object is not a reference then it can be rasterized in step 850.

If a check of the current node determines that all objects in that node have been rasterized then the current node's block pointer is freed, in step 860. The band can then be examined by exemplary rasterization routine 640, to determine if it contains additional nodes, in step 870. If there are additional nodes, the routine can advance to the next node, in step 880. The algorithm iterates through steps 810-850 for each node until objects in all nodes for the band being rasterized have been processed. If all nodes have been processed then rasterization is complete and the algorithm can terminate in step 890.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method for performing rasterization on a display list, wherein the display list includes bands associated with a virtual page object belonging to a first class of virtual page objects in the display list, the method comprising:
    parsing the virtual page object to identify at least one geometric band;
    identifying at least one available rasterization process to rasterize the at least one geometric band;
    creating a second virtual page object including the geometric band, wherein the second virtual page object belongs to a second class of virtual page objects derived from the first class of virtual page objects;
    sending the second virtual page object including the geometric band to an available rasterization process; and rasterizing the one geometric band using the available rasterization process, wherein the rasterization process operates on the geometric band in the second virtual page object.

2. The method of claim 1, wherein the method is executed by a master process and the at least one available rasterization process is selected from a set of slave rasterization processes operating in parallel under the control of the master process.

3. The method of claim 2, wherein any idle slave rasterization process is an available rasterization process.

4. The method of claim 2, wherein each operating slave rasterization process operates on a geometric band in a distinct virtual page object, wherein the distinct virtual page objects belong to the second class of virtual page objects.

5. The method of claim 4, wherein each operating slave rasterization process has its own copy of the distinct virtual page object.

6. The method of claim 2, wherein the slave rasterization processes can be remote processes.

7. The method of claim 1, wherein parsing the virtual page object to identify at least one geometric band further comprises traversing the display list to locate the geometric band.

8. The method of claim 1, wherein sending the second virtual page object including the geometric band to an available rasterization process further comprises:
sending a copy of the second virtual page object to the available rasterization process, if the rasterization process is remote; and
sending a reference to the second virtual page object to the available rasterization process, if the rasterization process is local.

9. The method of claim 1, wherein the first class of virtual page objects provides additional functionality when compared to the second class of virtual page objects.

10. A non-transitory computer-readable medium that stores instructions, which, when executed by a processor, perform steps in a method for performing rasterization on a display list, wherein the display list includes bands associated with a virtual page object belonging to a first class of virtual page objects in the display list, the method comprising:
parsing the virtual page object to identify at least one geometric band;
identifying at least one available rasterization process to rasterize the at least one geometric band;
creating a second virtual page object including the geometric band, wherein the second virtual page object belongs to a second class of virtual page objects derived from the first class of virtual page objects;
sending the second virtual page object including the geometric band to an available rasterization process; and
rasterizing the one geometric band using the available rasterization process, wherein the rasterization process operates on the geometric band in the second virtual page object.

11. The computer-readable medium of claim 10, wherein the method is executed by a master process and the at least one available rasterization process is selected from a set of slave rasterization processes operating in parallel under the control of the master process.

12. The computer-readable medium of claim 11, wherein any idle slave rasterization process is an available rasterization process.

13. The computer-readable medium of claim 11, wherein each operating slave rasterization process operates on a geometric band in a distinct virtual page object, wherein the distinct virtual page objects belong to the second class of virtual page objects.

14. The computer-readable medium of claim 13, wherein each operating slave rasterization process has its own copy of the distinct virtual page object.

15. The computer-readable medium of claim 11, wherein the slave rasterization processes can be remote processes.

16. The computer-readable medium of claim 10, wherein parsing the virtual page object to identify at least one geometric band further comprises traversing the display list to locate the geometric band.

17. The computer-readable medium of claim 10, wherein sending the second virtual page object including the geometric band to an available rasterization process further comprises:
sending a copy of the second virtual page object to the available rasterization process, if the rasterization process is remote; and
sending a reference to the second virtual page object to the available rasterization process, if the rasterization process is local.

18. The computer-readable medium of claim 10, wherein the first class of virtual page objects provides additional functionality when compared to the second class of virtual page objects.

19. A non-transitory computer-readable memory containing instructions for controlling a processor to perform steps in a method for performing rasterization on a display list, wherein the display list includes bands associated with a virtual page object belonging to a first class of virtual page objects in the display list, the method comprising:
parsing the virtual page object to identify at least one geometric band;
identifying at least one available rasterization process to rasterize the at least one geometric band;
creating a second virtual page object including the geometric band, wherein the second virtual page object belongs to a second class of virtual page objects derived from the first class of virtual page objects;
sending the second virtual page object including the geometric band to an available rasterization process; and
rasterizing the one geometric band using the available rasterization process, wherein the rasterization process operates on the geometric band in the second virtual page object.

20. The computer-readable memory of claim 19, wherein the method is executed by a master process and the at least one available rasterization process is selected from a set of slave rasterization processes operating in parallel under the control of the master process.

* * * * *